(12) United States Patent
Gallo

(10) Patent No.: US 10,712,027 B2
(45) Date of Patent: Jul. 14, 2020

(54) AIR FILTERING ASSEMBLY

(71) Applicant: Allen Gallo, Ford City, PA (US)

(72) Inventor: Allen Gallo, Ford City, PA (US)

(*) Notice: Subject to any disclaimer, the term of this patent is extended or adjusted under 35 U.S.C. 154(b) by 256 days.

(21) Appl. No.: 15/936,803

(22) Filed: Mar. 27, 2018

(65) Prior Publication Data

US 2019/0301755 A1  Oct. 3, 2019

(51) Int. Cl.
| | | |
|---|---|---|
| *B01D 46/10* | (2006.01) | |
| *F24F 7/013* | (2006.01) | |
| *F24F 13/28* | (2006.01) | |
| *F24F 3/16* | (2006.01) | |
| *F24F 13/20* | (2006.01) | |
| *B01D 46/00* | (2006.01) | |

(52) U.S. Cl.
CPC ........ *F24F 3/1603* (2013.01); *B01D 46/0006* (2013.01); *B01D 46/10* (2013.01); *F24F 7/013* (2013.01); *F24F 13/20* (2013.01); *F24F 13/28* (2013.01); *B01D 2273/30* (2013.01); *B01D 2279/35* (2013.01); *F24F 2003/1614* (2013.01); *F24F 2013/205* (2013.01)

(58) Field of Classification Search
CPC .......................... B01D 46/10; B01D 46/0006; B01D 46/0026; B01D 46/0045; B01D 2279/35; B01D 2273/30; F24F 3/1603; F24F 7/013; F24F 12/20; F24F 13/28; F24F 2003/1614; F24F 2013/205
USPC .................. 55/495, 505, 508, 511, 516, 518, 55/DIG. 31; 454/259, 309, 328, 337, 454/307, 313, 320, 353
See application file for complete search history.

(56) References Cited

U.S. PATENT DOCUMENTS

| | | | |
|---|---|---|---|
| 5,190,496 A * | 3/1993 | Shih-Chin | F24F 7/013 454/210 |
| 5,215,498 A * | 6/1993 | Wong | F24F 11/0001 454/208 |
| 5,312,467 A | 5/1994 | Wolfe | |
| 5,525,145 A * | 6/1996 | Hodge | B01D 46/001 96/17 |
| 5,951,727 A | 9/1999 | Spies et al. | |
| 6,110,245 A * | 8/2000 | Schlag | B01D 46/001 454/184 |
| 6,241,603 B1 * | 6/2001 | Watson | F24F 13/085 454/284 |
| 6,386,828 B1 * | 5/2002 | Davis | A01K 1/0052 415/147 |
| D483,103 S | 12/2003 | Dalzell | |
| 6,814,660 B1 * | 11/2004 | Cavett | B01D 46/0005 454/284 |
| 2004/0065029 A1 | 4/2004 | Morris | |
| 2004/0079230 A1 | 4/2004 | Schroder | |
| 2006/0105696 A1 * | 5/2006 | Wenger | F24F 7/013 454/254 |

(Continued)

*Primary Examiner* — Minh Chau T Pham

(57) ABSTRACT

An air filtering assembly for particulate removal includes a housing that defines an interior space. An aperture is positioned in a front of the housing and is configured to allow flow of air into the interior space. An opening is positioned in a back of the housing and is configured to allow flow of air from the interior space. A slot is positioned in a top of the housing. A filter is selectively insertable into the interior space through the slot. The filter is configured to remove particulates from the air that flows through the interior space from the front to the back.

11 Claims, 5 Drawing Sheets

(56) References Cited

U.S. PATENT DOCUMENTS

2006/0168925 A1* 8/2006 Whittemore ....... B01D 46/0005
  55/490
2008/0216456 A1   9/2008 Williams
2013/0067875 A1* 3/2013 Hartmann ............. B01D 46/10
  55/428

* cited by examiner

AIR FILTERING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to filtering assemblies and more particularly pertains to a new filtering assembly for particulate removal.

BRIEF SUMMARY OF THE INVENTION

An embodiment of the disclosure meets the needs presented above by generally comprising a housing that defines an interior space. An aperture is positioned in a front of the housing and is configured to allow flow of air into the interior space. An opening is positioned in a back of the housing and is configured to allow flow of air from the interior space. A slot is positioned in a top of the housing. A filter is selectively insertable into the interior space through the slot. The filter is configured to remove particulates from the air that flows through the interior space from the front to the back.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
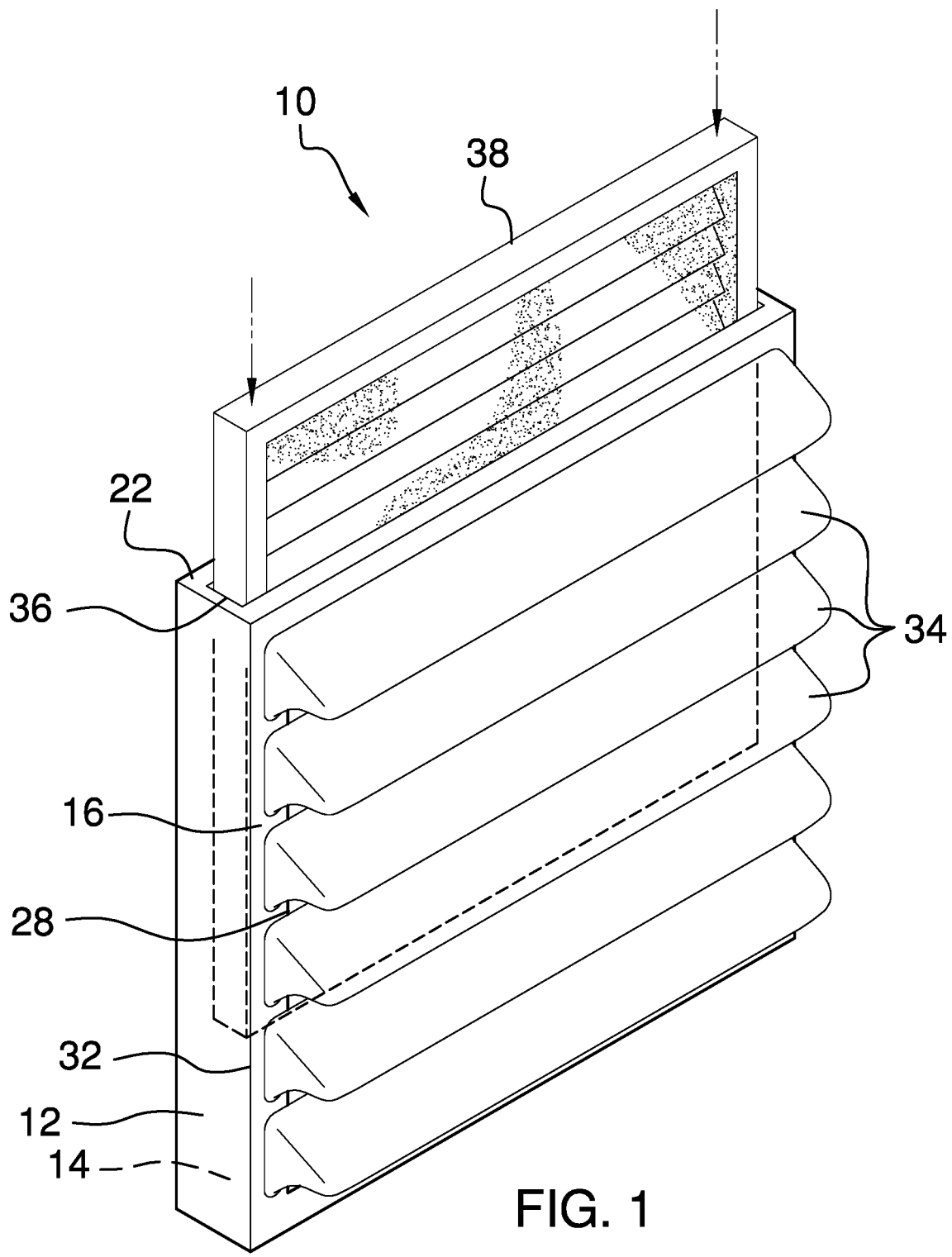
FIG. 1 is an isometric perspective view of an air filtering assembly according to an embodiment of the disclosure.
Figure 2:
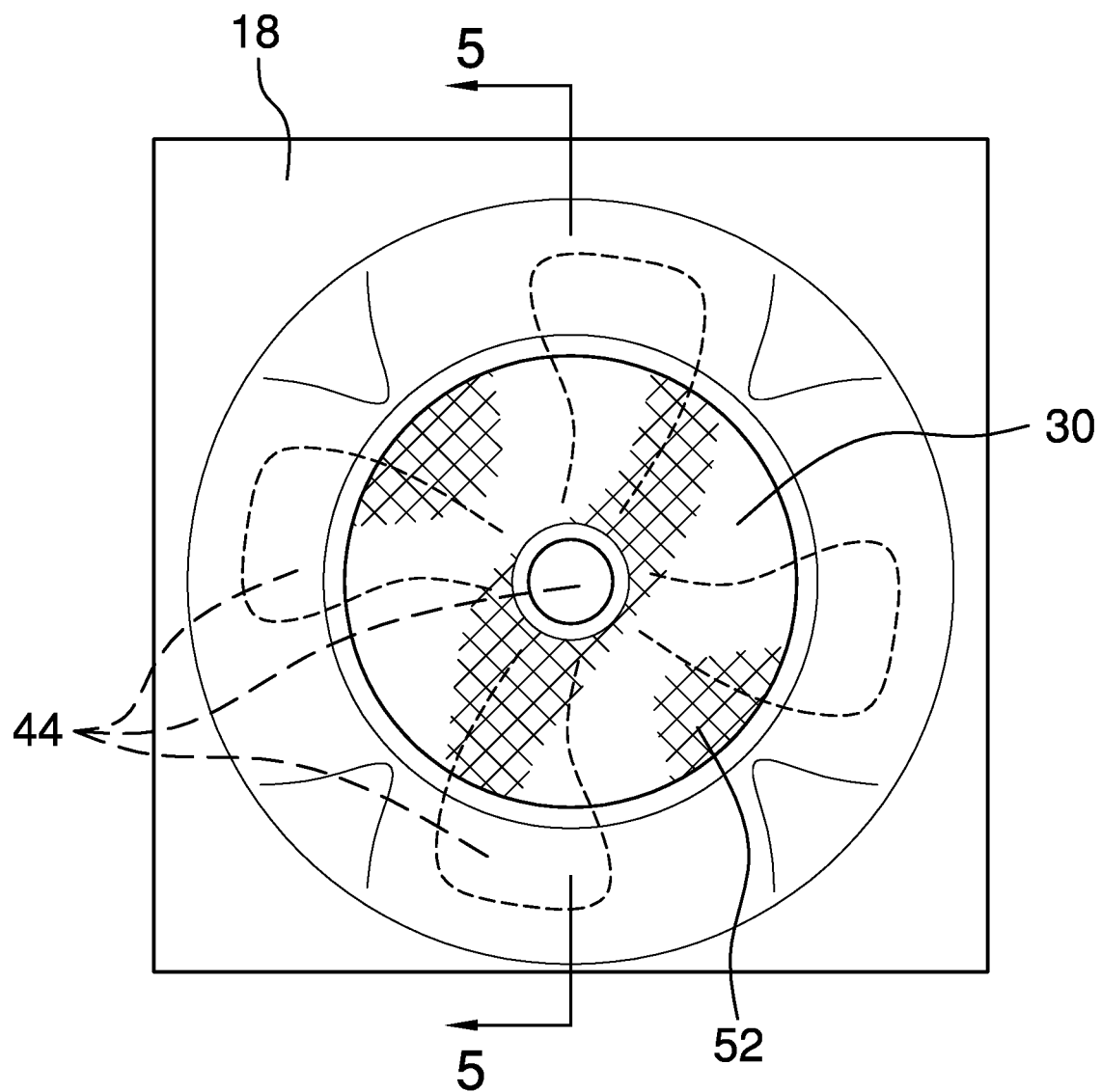
FIG. 2 is a back view of an embodiment of the disclosure.

With reference now to the drawings, and in particular to FIGS. 1 through 5 thereof, a new filtering assembly embodying the principles and concepts of an embodiment of the disclosure and generally designated by the reference numeral 10 will be described.

As best illustrated in FIGS. 1 through 5, the air filtering assembly 10 generally comprises a housing 12 that defines an interior space 14. The housing 12 is substantially rectangularly box shaped. The housing 12 has a front 16, a back 18, opposing sides 20, a top 22, and a bottom 24. The opposing sides 20, the top 22, and the bottom 24 taper from proximate to a midline 26 of the housing 12 to the back 18 so that the back 18 is dimensionally smaller than the front 16.

Figure 5:
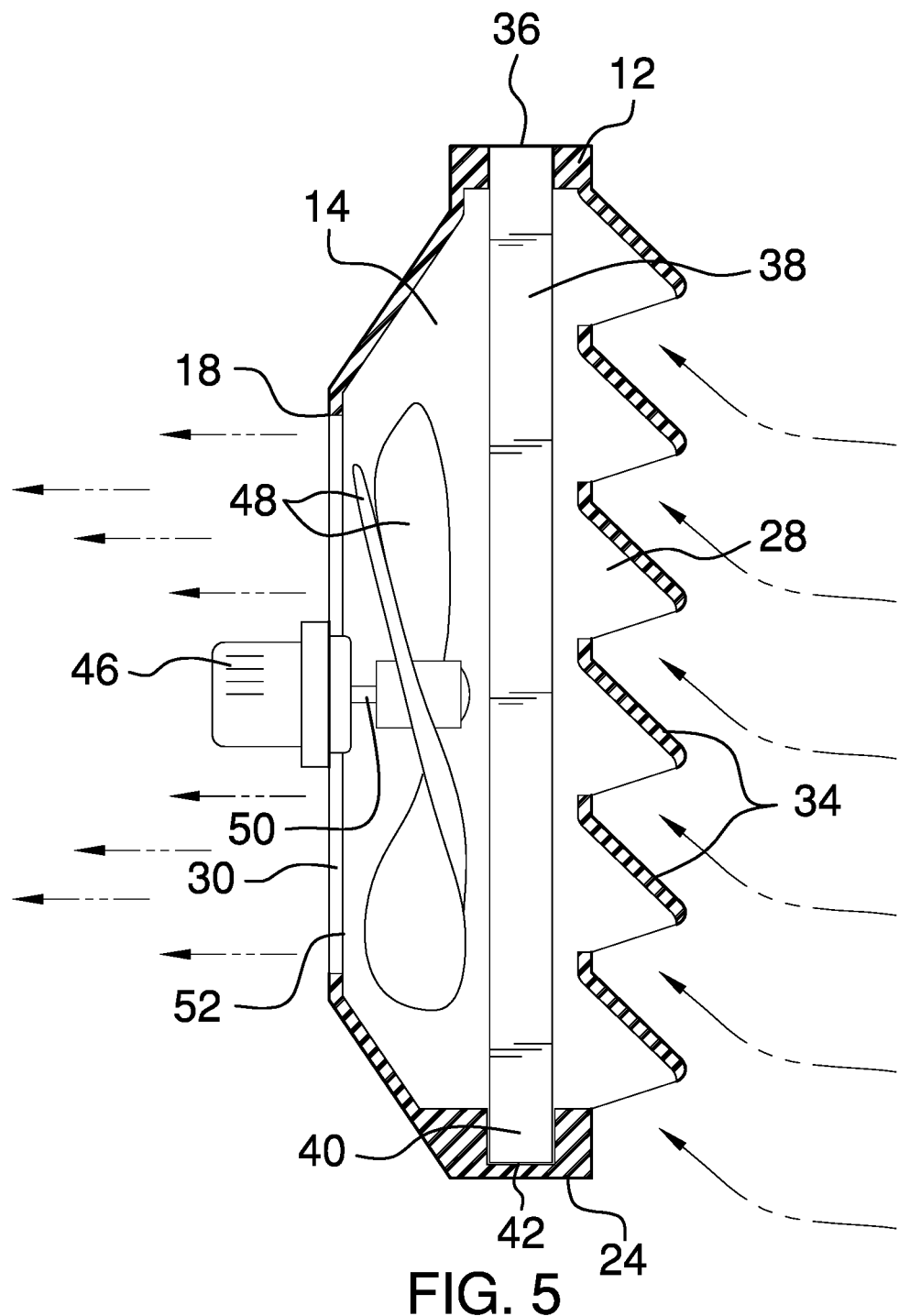
FIG. 5 is a cross-sectional view of an embodiment of the disclosure.

An aperture 28 is positioned in the front 16 of the housing 12 and an opening 30 is positioned in the back 18 of the housing 12. The aperture 28 and the opening 30 are configured to allow flow of air into and from the interior space 14, respectively, as shown in FIG. 5. The opening 30 is circularly shaped, and the aperture 28 is squarely shaped. The aperture 28 extends to proximate to a perimeter 32 of the front 16.

Figure 4:
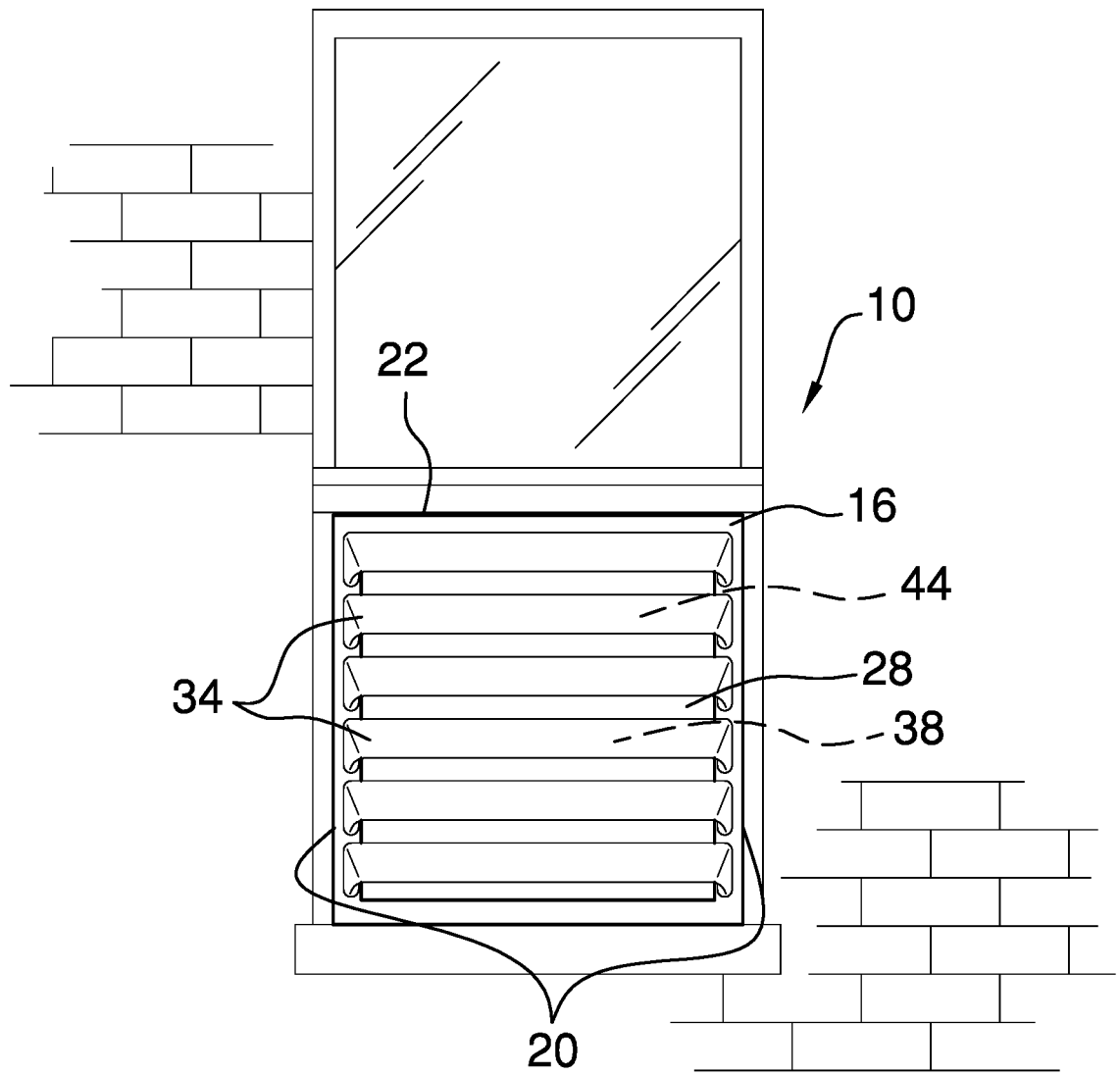
FIG. 4 is an in-use view of an embodiment of the disclosure.

A set of louvers 34 is coupled to the front 16 of the housing 12 and extends over the aperture 28, as shown in FIG. 4. The set of louvers 34 comprises six louvers 34. The set of louvers 34 is configured to deter entry of water and objects into the interior space 14.

Figure 3:
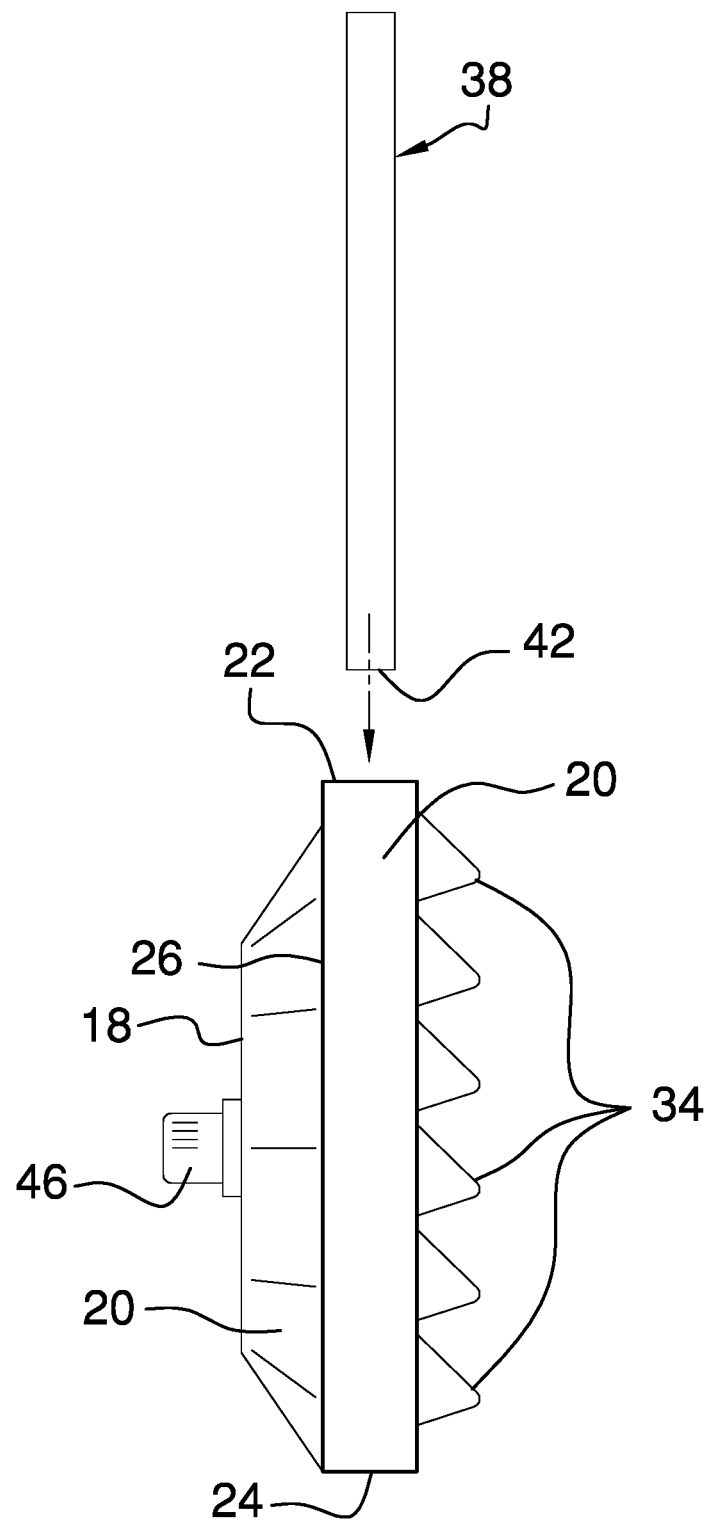
FIG. 3 is a side view of an embodiment of the disclosure.

A slot 36 is positioned in the top 22 of the housing 12, as shown in FIG. 1. The slot 36 is rectangularly shaped. The slot 36 extends from proximate to the opposing sides 20 of the housing 12. A filter 38 is selectively insertable into the interior space 14 through the slot 36, as shown in FIG. 3. The filter 38 is squarely shaped. The filter 38 is configured to remove particulates from the air that flows through the interior space 14 from the front 16 to the back 18. The housing 12 is selectively insertable into an opening 30 of a structure, such as a window frame, as shown in FIG. 4, or the screen of a door. The filter 38 is configured to remove pollen and other particulates from the air that flows through the interior space 14 into the structure.

A channel 40 extends into the bottom 24 of the housing 12 from the interior space 14, as shown in FIG. 5. The channel 40 is complementary to the slot 36 and a lower end 42 of the filter 38. The channel 40 is positioned to insert the lower end 42 of the filter 38 to retain the filter 38 parallel to the front 16 and the back 18 of the housing 12.

A fan 44 is coupled to the housing 12 and is positioned in the interior space 14, as shown in FIG. 5. The fan 44 is configured to produce a current of air that flows through the filter 38 to remove particulates from the air. The fan 44 comprises a motor 46 and a plurality of blades 48. Each blade 48 is coupled to and extends from a shaft 50 of the motor 46. The motor 46 is positioned to urge rotation of the blades 48 concurrent with the shaft 50 to produce the current of air.

A grate 52 is coupled to the back 18 of the housing 12 and extends over the opening 30. The grate 52 is configured to deter entry of the objects into the interior space 14. The motor 46 is coupled to and is centrally positioned through the grate 52 so that the shaft 50 extends into the interior space 14, as shown in FIG. 5.

In use, fan 44 is configured to produce the current of air that flows through the filter 38. The filter 38 is configured to remove the particulates from the air.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An air filtering assembly comprising:
   a housing defining an interior space, said housing having opposing sides, said opposing sides, said top, and said bottom tapering from proximate to a midline of said housing to said back such that said back is dimensionally smaller than said front;
   an aperture positioned in a front of said housing wherein said aperture is configured for flowing of air into said interior space;
   a slot positioned in a top of said housing;
   an opening positioned in a back of said housing wherein said aperture is configured for flowing of air from said interior space, said opening being circularly shaped;
   a filter selectively insertable into said interior space through said slot wherein said filter is configured for removing particulates from the air flowing through said interior space from said front to said back; and
   a fan coupled to said housing and positioned in said interior space between said back of said housing and said filter such that said fan is configured for producing a current of air flowing through said opening into said housing and through said filter wherein said filter is configured for removing particulates from the air, said fan comprising a motor and a plurality of blades, each said blade being coupled to and extending from a shaft of said motor such that said motor is positioned for urging rotation of said blades concurrent with said shaft for producing the current of air, a diameter of said blades being greater than a diameter of said opening.

2. The assembly of claim 1, further including said housing being substantially rectangularly box shaped.

3. The assembly of claim 2, further including said aperture and said filter being squarely shaped.

4. The assembly of claim 1, further including said aperture extending to proximate to a perimeter of said front.

5. The assembly of claim 1, further including a set of louvers coupled to said front of said housing and extending over said aperture wherein said set of louvers is configured for deterring entry of water and objects into said interior space.

6. The assembly of claim 5, further including said set of louvers comprising six said louvers.

7. The assembly of claim 1, further including said slot being rectangularly shaped, said slot extending from proximate to opposing sides of said housing.

8. The assembly of claim 1, further including a channel extending into said bottom of said housing from said interior space, said channel being complementary to said slot and a lower end of said filter wherein said channel is positioned for inserting said lower end of said filter for retaining said filter parallel to said front and said back of said housing.

9. The assembly of claim 1, further including a grate coupled to said back of said housing and extending over said opening wherein said grate is configured deterring entry of objects into said interior space.

10. The assembly of claim 1, further including said motor being coupled to and centrally positioned through said grate such that said shaft extends into said interior space.

11. An air filtering assembly comprising:
    a housing defining an interior space, said housing being substantially rectangularly box shaped, said housing having a front, a back, opposing sides, a top, and a bottom, said opposing sides, said top, and said bottom tapering from proximate to a midline of said housing to said back such that said back is dimensionally smaller than said front;
    an aperture positioned in said front of said housing wherein said aperture is configured for flowing of air into said interior space, said aperture being squarely shaped, said aperture extending to proximate to a perimeter of said front;
    a set of louvers coupled to said front of said housing and extending over said aperture wherein said set of louvers is configured for deterring entry of water and objects into said interior space, said set of louvers comprising six said louvers;
    a slot positioned in said top of said housing, said slot being rectangularly shaped, said slot extending from proximate to said opposing sides of said housing;
    an opening positioned in said back of said housing wherein said aperture is configured for flowing of air from said interior space, said opening being circularly shaped;
    a filter selectively insertable into said interior space through said slot wherein said filter is configured for removing particulates from the air flowing through said interior space from said front to said back, said filter being squarely shaped;
    a channel extending into said bottom of said housing from said interior space, said channel being complementary to said slot and a lower end of said filter wherein said channel is positioned for inserting said lower end of said filter for retaining said filter parallel to said front and said back of said housing;

a fan coupled to said housing and positioned in said interior space between said back of said housing and said filter such that said fan is configured for producing a current of air flowing through said opening into said housing and through said filter wherein said filter is configured for removing particulates from the air, said fan comprising a motor and a plurality of blades, each said blade being coupled to and extending from a shaft of said motor such that said motor is positioned for urging rotation of said blades concurrent with said shaft for producing the current of air, a diameter of said blades being greater than a diameter of said opening;

a grate coupled to said back of said housing and extending over said opening wherein said grate is configured deterring entry of the objects into said interior space, said motor being coupled to and centrally positioned through said grate such that said shaft extends into said interior space; and wherein said fan is configured for producing the current of air flowing through said filter wherein said filter is configured for removing the particulates from the air.

\* \* \* \* \*